United States Patent [19]

Jenner et al.

[11] Patent Number: 4,927,646
[45] Date of Patent: May 22, 1990

[54] SUCRALOSE SWEETENING COMPOSITION

[75] Inventors: Michael R. Jenner, Goring-on-Thames; Graham Jackson, Reading, both of Great Britain

[73] Assignee: Tate & Lyle PLC, Great Britain

[21] Appl. No.: 120,077

[22] Filed: Nov. 13, 1987

[30] Foreign Application Priority Data

Nov. 13, 1986 [GB] United Kingdom ............... 8627139

[51] Int. Cl.$^5$ ............................................. A23L 1/236
[52] U.S. Cl. .................................... 426/96; 426/548; 426/658; 426/804; 426/262; 426/323
[58] Field of Search ............... 426/96, 658, 548, 804, 426/262, 323

[56] References Cited

U.S. PATENT DOCUMENTS

| | | | |
|---|---|---|---|
| 3,795,746 | 3/1974 | Walton | 426/648 |
| 4,277,511 | 7/1981 | Bliznak et al. | 426/658 |
| 4,343,934 | 8/1982 | Jenner | 426/658 |
| 4,405,654 | 9/1983 | Lee | 426/658 |
| 4,473,546 | 9/1984 | Jackson et al. | 426/658 |
| 4,495,170 | 1/1985 | Beyts et al. | 424/48 |
| 4,549,013 | 10/1985 | Hougle | 426/658 |
| 4,612,373 | 9/1986 | Khan et al. | 426/658 |
| 4,631,195 | 12/1986 | Colliopoulos | 426/548 |
| 4,649,058 | 3/1987 | Schwengers | 426/658 |

Primary Examiner—Jeanette Hunter
Attorney, Agent, or Firm—Ostrolenk, Faber, Gerb & Soffen

[57] ABSTRACT

A sweetener concentrate containing sucralose and having improved thermal stability comprises particles of substantially non-crystalline sucralose dispersed evenly throughout, and adhering to, a water soluble oligosaccharide, the concentrate containing between about 20% and 80% sucralose on a dry weight basis. The oligosaccharide is preferably a glucose oligosaccharide such as maltodextrin. The concentrate can be prepared by forming a co-solution of the sucralose and oligosaccharide in water which is then dried. Other ingredients such as other high intensity sweeteners and flavorings may also be included.

12 Claims, No Drawings

SUCRALOSE SWEETENING COMPOSITION

This invention relates to sweetener concentrates comprising the high intensity sweetener sucralose (4,1',6'-trichloro-4,1',6'-trideoxygalactosucrose) and certain water-soluble oligosaccharides such as maltodextrins, hydrolysed starches, and polydextrose. The use of sucralose as a sweetener is disclosed in British Patent Specification No. 1,543,167.

By a "sweetener concentrate" there is meant a composition that contains a high proportion of a high intensity sweetener and which thus provides a useful means of storing and transporting the sweetener in a concentrated form. Sweetener concentrates may be stored and transported under a wide range of environmental conditions and must, therefore, be stable to extremes of temperature, etc.

We have found that, generally speaking, sucralose is very stable to high temperatures in foods and beverages in which it is dispersed at relatively low concentrations. However, pure, dry, crystalline sucralose is rather less stable to high temperatures.

In co-pending British Patent Application No. GB 2,169,601 A, it is disclosed that discoloration of crystalline sucralose may occur under hot, dry conditions. For example, when pure, dry crystalline sucralose is maintained at 100° C. the colour changes from colourless (white) to pale brown after about 20 minutes. Over long periods at temperatures above about 40° C. significant degradation of sucralose may occur.

As disclosed in GB 2,169,601 A, the stability of crystalline sucralose under hot, dry conditions can be enhanced considerably by co-crystallising the sweetener with a minor amount of a nitrogenous base such as niacinamide. However, this complicates the crystallisation process and adds to the cost of manufacture of sucralose. Therefore, there remains a need for a simpler, more convenient method of stabilising sucralose to high temperatures.

Surprisingly, we have now found that the thermal stability of sucralose is greatly enhanced when it is intimately combined with water-soluble stabilising agents such as maltodextrins. This spray-dried sweetener concentrates comprising sucralose and maltodextrin in the ratios 2:3, 1:1 and 3:2 by weight show no loss of sucralose after 14 weeks of storage at 45° C.

In contrast, a simple dry mixture of crystalline sucralose and maltodextrin containing 33.8% sucralose by weight showed some loss of sucralose after 25 days storage at 45° C. Pure, dry crystalline sucralose itself discolours after about one week at 45° C. with measurable losses of sucralose after about three to four weeks. Thus, simple dispersal of the sucralose particles in the stabilising agent does not provide a satisfactory product, although it does enhance the thermostability of sucralose to some extent.

In order to obtain a highly thermostable sweetener concentrate according to the present invention it is necessary to form a more intimate combination of sucralose with the stabilising agent. This may be achieved by a variety of conventional methods, including spray-drying and freeze-drying of a common solution of sucralose and the stabilising agent.

We have obtained satisfactory results with spray-drying and we have found this to be a convenient method of preparing the sweetener concentrates. Sucralose itself cannot be spray-dried because it melts and adheres to the internal surfaces of the apparatus when treated in this manner. However, aqueous co-solutions of sucralose and maltodextrin can be spray-dried satisfactorily at sucralose to maltodextrin ratios of up to about 80:20 by weight.

Microscopic examination of the sweetener concentrates of the present invention indicates that they comprise a non-crystalline form of sucralose dispersed evenly throughout and adhering closely to the stabilising agent.

Thus, according to the present invention there is provided a sweetener concentrate comprising particles of substantially non-crystalline sucralose dispersed evenly throughout, and adhering to, a water-soluble oligosaccharide, the concentrate containing between about 20% and 80% sucralose on a dry weight basis.

The water-soluble oligosaccharide used as the stabilising agent may be selected from the fairly wide range of food grade materials suitable for the purpose. These include glucose oligosaccharides and mixtures thereof such as maltodextrins, hydrolysed starches, and polymerised glucose (e.g. polydextrose). We have found that maltodextrins are particularly good stabilising agents for sucralose and they have the added advantage of being relatively inexpensive.

The sweetener concentrates of the present invention may optionally contain other water-dispersible ingredients such as other high intensity sweeteners and flavourings. In particular, sweetener concentrates comprising synergistic combinations of sucralose with other high intensity sweeteners such as saccharin, acesulfame-K and stevioside (as disclosed in British Patent Specification No. GB 2,098,848 B) and cyclamate (as disclosed in British Patent Specification No. GB 2,154,850 A) are of interest. Other useful sweetener concentrates include those containing sucralose and dipeptide sweeteners, because such combinations possess a sucrose-like quality of sweetness as disclosed in British Patent Specification No. GB 2,153,651 A.

Some of the water-soluble oligosaccharides mentioned above have been used as bulking agents to provide highly diluted formulations of various food ingredients. For example, a bulked sweetener prepared by mixing a solution containing 222.2 grams dry weight of maltodextrin with 0.5 grams of sucralose and spray-drying to a bulk density of 0.2 g/ml is disclosed in British Patent Specification No. 1,543,167. This sweetening composition has approximately the same sweetness as an equal volume of sucrose and is intended for domestic use, for example as a "table-top" sweetener. It contains 0.22% by weight of sucralose.

In complete contast to this table-top, "spoon-for-spoon" product, the sweetener concentrates of the present invention contain a very much higher proportion of sucralose, generally more than about 20%, and have a sweetness of around 100 times or more than that of sucrose on a weight for weight basis.

The invention is illustrated further by the following non-limiting Examples.

EXAMPLE 1

Preparation of Sweetener Concentrates

Mixtures of crystalline sucralose and maltodextrin (CPC "Snowflake" 01915) in the proportion 2:3, 1:1 and 3:2 by weight were dissolved in water to give 40% w/v solutions. Each solution was spray-dried using an "Anhydro" Laboratory Drier, Type S1, as follows:

| Operating Conditions | Blend ratios of sucralose to maltodextrin | | |
|---|---|---|---|
| | 40/60 | 50/50 | 60/40 |
| Inlet temperature (°C.) | 200 | 195 | 195 |
| Outlet temperature (°C.) | 91 | 91 | 92 |
| Power input (Kw) | 5 | 5 | 5 |
| Atomiser speed (rpm) | 180 | 180 | 180 |
| Pump reading | 20 | 18 | 15* |

*equivalent to approximatel 1.5 l/h

EXAMPLE 2

Stability of Sweetener Concentrates

Samples (3 grams) of each sweetener concentrate were packed into 10 double, closed polythene bags and stored in an oven at 45° C. After 30 days, samples of each concentrate were removed from the oven at approximately weekly intervals and stored in a freezer at 0° C. until required for analysis.

Samples of the freshly-prepared concentrates (day 0) and samples removed from the oven at 90 days and 98 days were analysed for their sucralose content by h.p.l.c.

Similarly, pure crystalline sucralose was passed through a 0.75 mm screen to break up agglomerated particles and was stored at 45° C. under similar conditions. Samples were taken over a period of 31 days and were analysed by h.p.l.c. as before. A significant degree of loss was taken to be a decrease of 2% in the sucralose value. It was found that the pure sucralose had undergone significant loss after about 25 days. In contrast, none of the sucralose/maltodextrin concentrates had undergone any significant loss even after 98 days.

We claim:

1. A heat stable sweetener concentrate comprising particles of substantially non-crystalline sucralose dispersed evenly throughout, and closely adhering to, a water-soluble glucose oligosaccharide or mixture of said oligosaccharides, the concentrate containing between about 20% and 80% sucralose on a dry weight basis.

2. The sweetener concentrate of to claim 1, in which the oligosaccharide is selected from the group consisting of maltodextrin, hydrolysed starch and polymerised glucose.

3. The sweetener concentrate of claim 1, containing at least one other water dispersible ingredient selected from the group consisting of high intensity sweeteners other than sucralose and flavourings.

4. The sweetener concentrate of claim 3, in which said high intensity sweeteners are selected from the group consisting of saccharin, acesulphame-K, stevioside, cyclamate and dipeptide sweeteners.

5. The sweetener concentrate of claim 1 in which the ratio of sucralose to oligosaccharide is from 40:60 to 60:40 on a dry weight basis.

6. A method of preparing a heat stable sweetener concentrate containing sucralose and a water-soluble glucose oligosaccharide or mixture of said oligosaccharides, comprising forming a common water solution of sucralose and the oligosaccharide containing from about 20% to 80% sucralose on a dry weight basis and then drying the solution.

7. The method of claim 6, in which the solution is spray-dried.

8. The method of claim 6, in which the ratio of sucralose to oligosaccharide is from 40:60 to 60:40 on a dry weight basis.

9. The method of claim 8, in which the oligosaccharide is selected from the group consisting of maltodextrin, hydrolysed starch and polymerised glucose.

10. The method of claim 6, in which the solution also contains one or more other water dispersible ingredients.

11. The method of claim 6, in which the solution also contains at least one other water dispersible ingredient selected from the group consisting of high intensity sweeteners other than sucralose and flavourings.

12. The method according to claims 11 in which the said high intensity sweeteners are selected from the group consisting of saccharin, acesulfame-K, stevioside, cyclamate and dipeptide sweeteners.

* * * * *